United States Patent [19]

Leblanc et al.

[11] 4,408,931
[45] Oct. 11, 1983

[54] SHOCK CELL PRODUCT

[75] Inventors: Raymond F. Leblanc, North Canton; William T. Cummins, Mogadore, both of Ohio

[73] Assignee: Teledyne Industries Inc., Los Angeles, Calif.

[21] Appl. No.: 257,881

[22] Filed: Apr. 27, 1981

[51] Int. Cl.³ ............................................. E02B 3/20
[52] U.S. Cl. .................................. 405/213; 114/219; 405/211
[58] Field of Search ..................... 405/211–215; 114/219, 220; 188/322.17, 322.19

[56] References Cited

U.S. PATENT DOCUMENTS

| 2,572,160 | 10/1951 | Kelly et al. | 403/228 |
| 2,572,215 | 10/1951 | Swart | 403/228 |
| 3,230,000 | 1/1966 | Simpson | 403/228 |
| 3,991,582 | 11/1976 | Waldrop et al. | 405/213 |
| 3,995,437 | 12/1976 | Drewett | 114/219 X |
| 4,005,672 | 2/1977 | Files | 114/219 |
| 4,098,211 | 7/1978 | Files et al. | 114/219 |
| 4,109,474 | 8/1978 | Files et al. | 405/213 |

Primary Examiner—Dennis L. Taylor
Attorney, Agent, or Firm—Frease & Bishop

[57] ABSTRACT

An energy-absorbing shock cell for mounting bumper devices on legs of offshore oil rig structures having inner and outer metal tubes connected by an intervening vulcanized rubber sleeve maintained under compression adhesively bonded to the inner and outer metal tubes. The shock cell is made by a series of operations in which portions of the metal tubes are coated with adhesive material, and the rubber sleeve is bonded to the adhesive coated areas by vulcanization and post-vulcanized heating.

3 Claims, 11 Drawing Figures

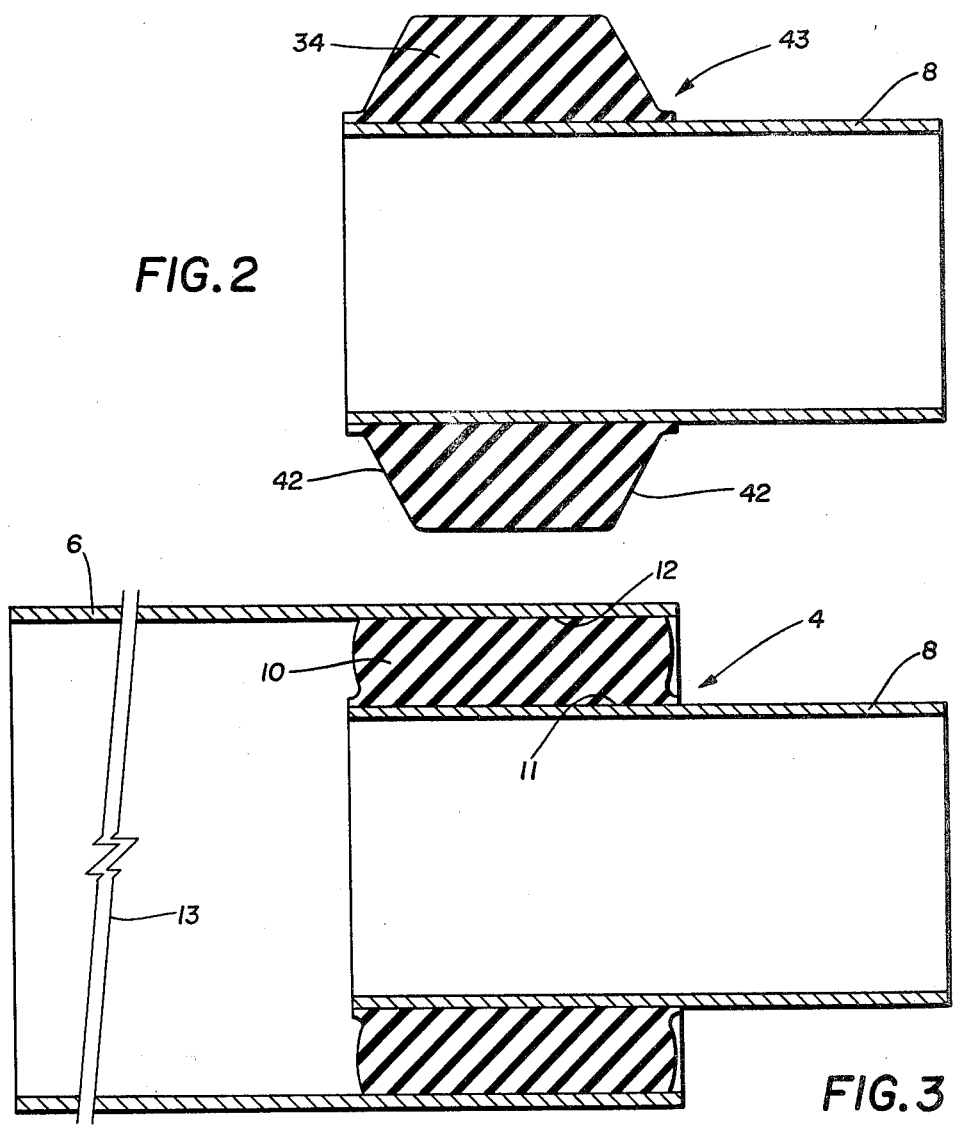
FIG. 2
FIG. 3
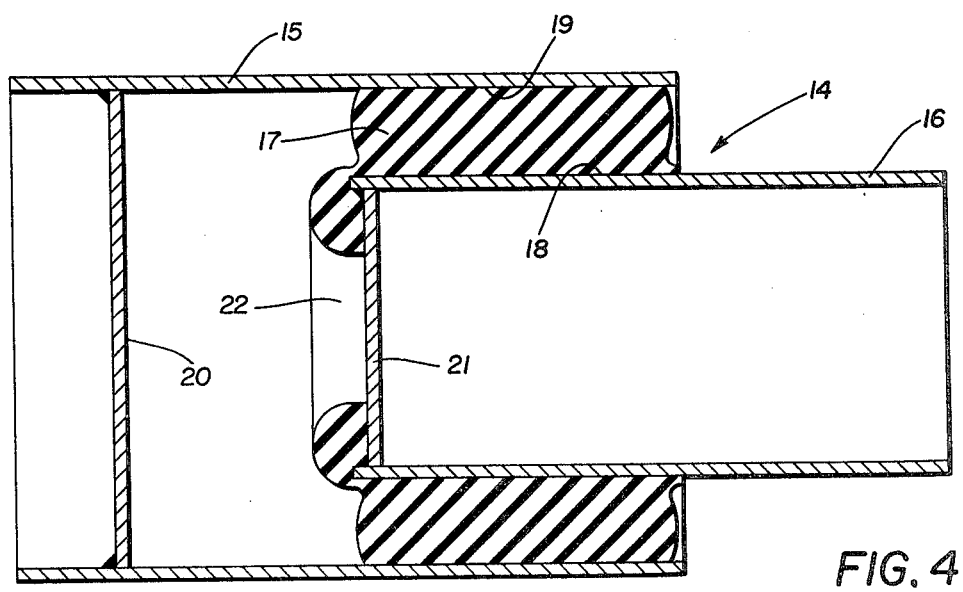
FIG. 4

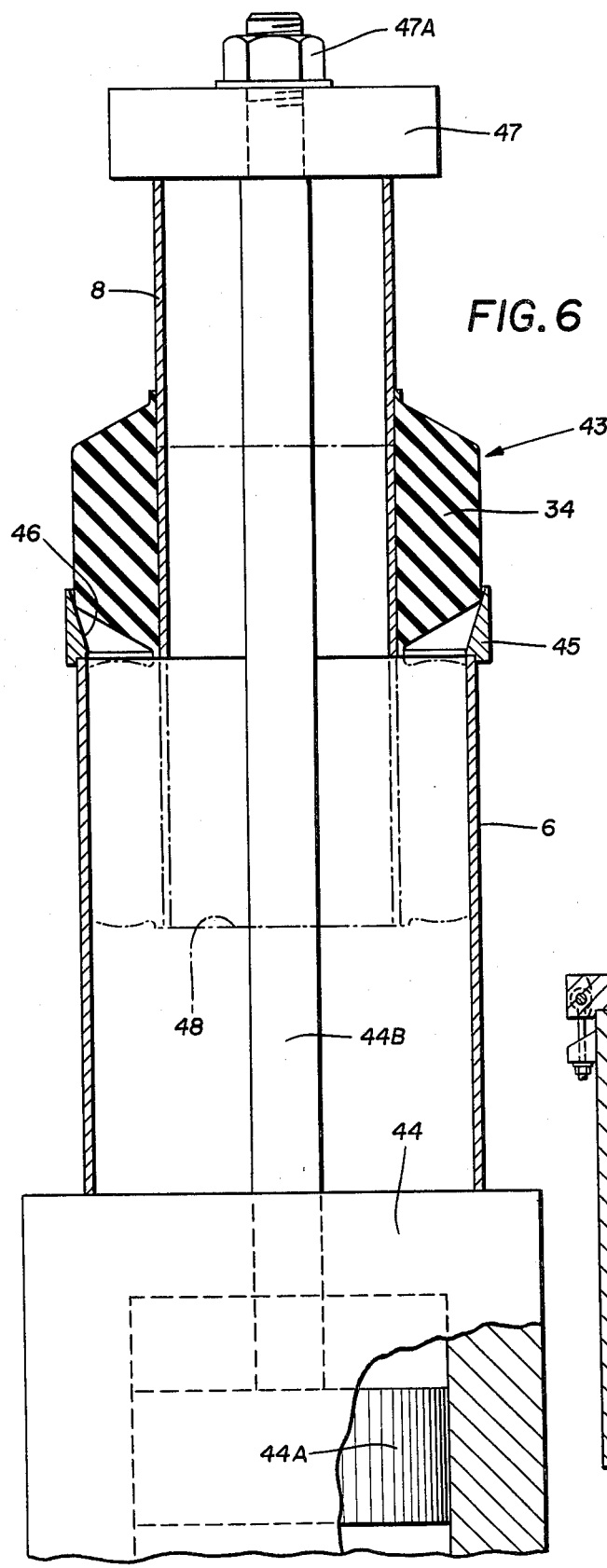
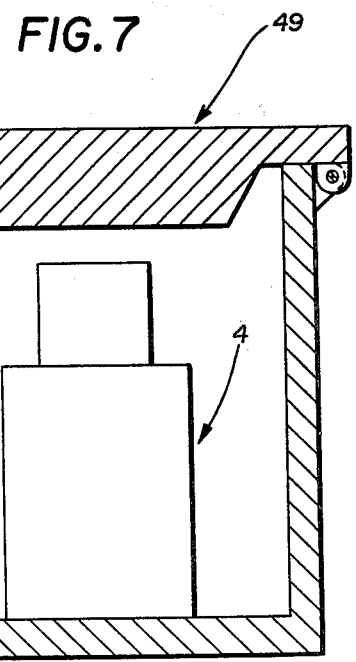

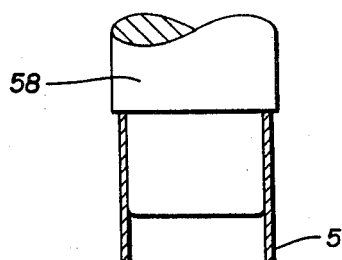
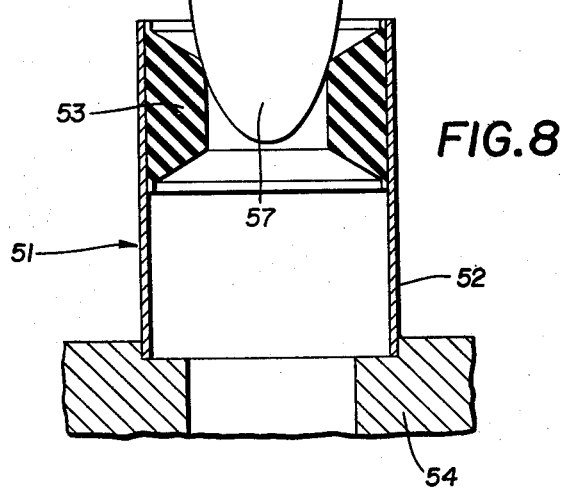
FIG.8
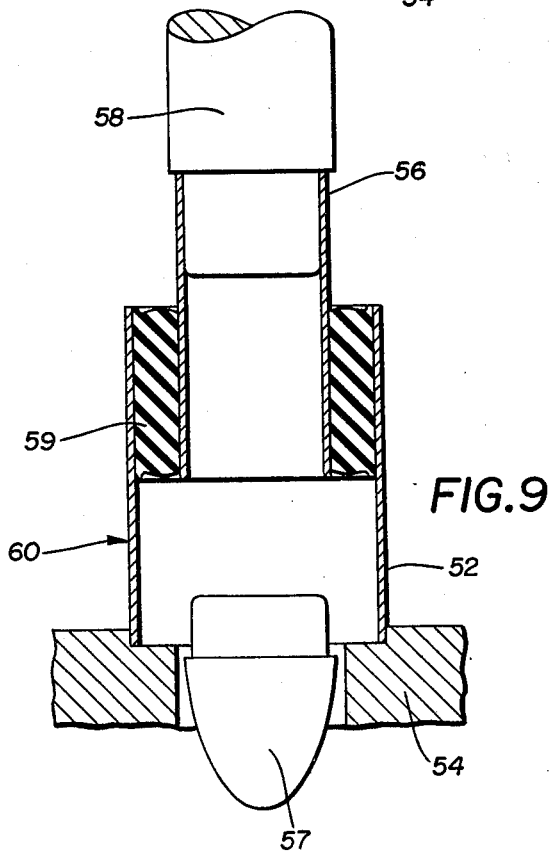
FIG.9
FIG.10
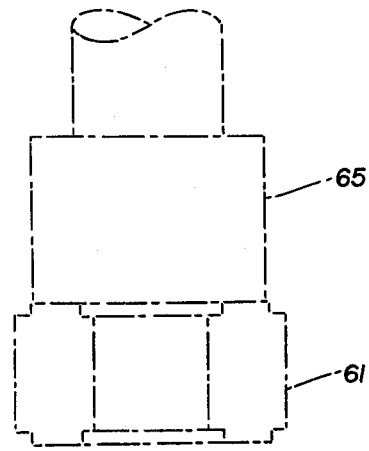
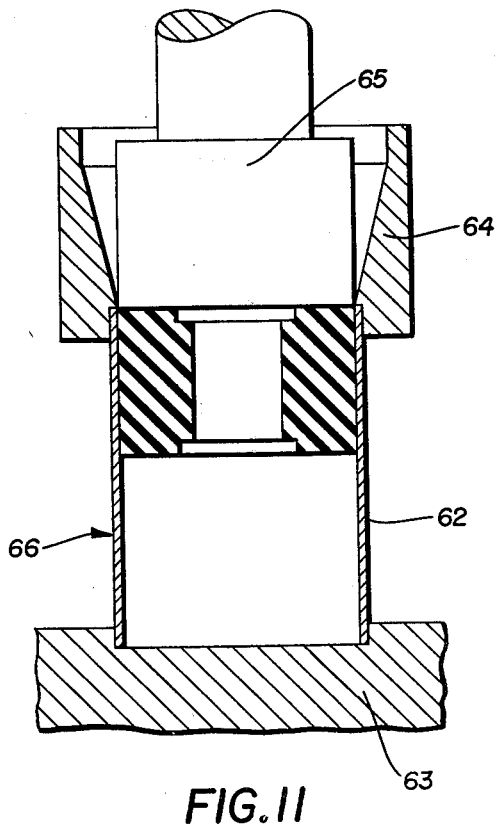
FIG.11

SHOCK CELL PRODUCT

BACKGROUND OF THE INVENTION

1. Field of the Invention

The invention relates to energy-absorbing shock cells for mounting bumper devices on outwardly downwardly slanting legs of offshore oil rig platforms, barge loading docks or similar structures. More particularly the invention relates to a new method of manufacturing such a shock cell which has inner and outer steel pipe members with an intervening rubber sleeve bonded with adhesives and vulcanization around and to the inner end portion of the inner pipe member and within and to the outer end portion of the outer pipe member with the sleeve rubber under extreme compression between the pipe members capable of absorbing energy by deflection of the rubber when external force is applied to the outer end of the inner pipe member.

In addition, the invention relates to a method of making such a shock cell without restrictions as to the length of the outer pipe member so as to enable shock cells having different outer pipe member length requirements to be used to mount a bumper device on a platform leg extending angularly downwardly outwardly into offshore water, without an outer metal pipe section having to be welded to the outer shock cell pipe member to obtain the necessary length of shock cell outer pipe member required when mounting a bumper device on an angularly extending platform leg.

2. Description of the Prior Art

Shock cells have been used traditionally to form the upper mount or the upper and lower mounts for vertical members mounted thereby on angularly extending platform legs between which vertical members bumper devices are supported. Sometimes the vertical members themselves act as bumpers being surrounded by rotatable rubber tires or other resilient members or rings.

These traditional shock cells known in the art comprise inner and outer cylindrical metal pipe members and a rubber bushing or sleeve therebetween bonded or cemented to the inner end of the inner pipe member and to the outer end of the outer pipe member. The free end of the outer pipe member usually is welded or otherwise mounted on one of the legs of an oil rig platform structure.

When two spaced shock cells are used to support a vertical bumper member on an angularly extending platform leg, the upper shock cell must have an outer pipe member longer than that of the lower shock cell. It has not been believed to be economically feasible to manufacture such traditional shock cells with numerous different length outer pipe members. This is because such different length outer pipe member products in accordance with past manufacturing practice each requires its own mold wherein the cavity must receive the two pipe members for bonding the rubber sleeve to the inner and outer pipe members by vulcanization.

This situation in the past has required a standard sized shock cell, when used as the upper mount for a vertical bumper device, to have a pipe section welded to the shock cell outer pipe member to obtain the required length of outer cell pipe member to satisfy the angular location of the platform leg on which the shock cell is mounted as well as the length of the vertical bumper member.

Such welded extension joints are quite visible when inspecting offshore oil rig installations; and such welded joints may be objectionable and may be the location of failure of the shock cell when a ship or barge bumps the bumper device with extreme force, either during ship headway movement or during up and down movement of the ship against the bumper as a result of wave action.

The traditional prior art shock cell has another objectionable characteristic resulting from its manufacture using usual rubber molding and vulcanizing procedures to bond the rubber sleeve located between the outer end of the outer pipe member and the inner end of the inner pipe member to both members at one time in one operation.

In such usual procedure, the inner and outer pipe members are placed and held in a suitable mold cavity with the inner end of the inner pipe member extending or telescoped coaxially into and overlapped by the outer end of the outer large diameter pipe member. A sufficient quantity of uncured rubber is supplied between the telescoped ends of the two pipe members. Then the mold is closed and heated to carry out a usual vulcanizing operation to bond the rubber to the ends of the two pipe members under suitable temperature and time conditions for the particular rubber composition being vulcanized.

The shock cell pipe members bonded to and joined by the vulcanized rubber sleeve is removed from the mold. During cooling, the rubber bonded to the two pipe members contracts or shrinks somewhat with the result that the rubber body between the pipe member ends has a condition of tension therein and the bonds between the rubber body and pipe members ends also are under tension.

Such prior shock cell absorbs energy upon deflection of the rubber when the inner member is forcefully telescoped into the outer member until the rubber fails in tension at one of the bonds between the rubber body and pipe members or in shear within the tensioned body. The residual force after shock cell failure is transmitted directly to the platform structure.

Various types of such traditional shock cells and bumpers mounted thereby are shown in U.S. Pat. Nos. 3,991,582; 4,005,672; 4,098,211 and 4,109,474.

Accordingly, there is an existing need and long-standing want in mounting bumper devices an oil rig structures for a shock cell which eliminates welded joints in the outer pipe member of such cells; and for a shock cell which has the ability to absorb energy by substantially increased deflection of the rubber sleeve while transmitting a smaller residual force to the platform structure when the bumper mounted on the shock cell is struck severely by a vessel, as compared with smaller rubber deflection and larger residual force transmitted to the platform structure characterizing prior devices.

SUMMARY OF THE INVENTION

Objectives of the invention include providing a new shock cell construction having inner and outer ends of inner and outer pipe members bonded together by an intervening rubber sleeve or body maintained under high compression between the bonded pipe member ends; providing such a shock cell construction in which the rubber body under compression is bonded to the adjacent surfaces of the pipe members by adhesives and vulcanization; providing such a shock cell construction in which the outer pipe member may have any desired or predetermined length free of circumferential welds; providing a new method of making such a shock cell in which a ringlike rubber sleeve or body having an outer diameter substantially greater than the inner diameter of the outer pipe member of the resultant shock cell is bonded adhesively and by vulcanization to an outer portion of one end of the inner shock cell pipe member, then the rubber body bonded to the inner pipe member is compressed and inserted or "shot" into an end portion of the shock cell outer pipe member and thereafter is post-vulcanization-bonded to the outer pipe member by the addition of adhesives and heat; providing by such manufacture a new shock cell characterized by energy absorption properties of a predetermined amount during which substantially greater deflection of the rubber body accompanied by a smaller residual force transmitted to the platform structure when the cell subjected to an external force occur, as compared with energy absorbed of the same amount by a prior art shock cell with smaller deflection and larger residual force transmitted to a platform structure; and providing a new shock cell manufacture procedure and product which achieve the stated objectives in a reliable, efficient, and easily practiced manner, and which solve problems and satisfy needs that long have existed in the field of mounting bumper devices on offshore oil rig structures.

These and other objectives and advantages may be obtained by the new shock cell construction and method of manufacture, the general natures of which are set forth below and may be stated, first, as comprising a shock cell having inner and outer pipe members connected together by an intervening annular sleeve or ringlike rubber body under compression bonded to end portions of the cell pipe members adhesively and by vulcanization; and may be stated, second, as a method of making shock cells including the steps of adhesively and by vulcanization bonding an annular rubber body to and surrounding one end portion of an inner pipe member which body has a diameter greater than the internal diameter of an outer pipe member to be connected to the inner pipe member by said body, then compressing and inserting the annular rubber body on the inner pipe member into an end portion of an outer pipe member, and then post-vulcanizing the thus assembled pipe members and compressed rubber body to bond the rubber body to the outer pipe member by the addition of adhesives and heat.

BRIEF DESCRIPTION OF THE DRAWINGS

Preferred embodiments of the invention—illustrative of the best mode in which applicants have contemplated applying the principles—are set forth in the following description and shown in the drawings and are particularly and distinctly pointed out and set forth in the appended claims.

FIG. 2 is a sectional view of an inner shock cell pipe member with an annular rubber body bonded to one end portion thereof;

FIG. 3 is a view similar to FIG. 2 of the parts of FIG. 2 bonded to an outer shock cell pipe member to form an improved shock cell;

FIG. 4 is a view similar to FIG. 3 showing a modified form of new shock cell construction;

FIG. 6 is a diagrammatic view illustrating the insertion or "shooting" of the vulcanized assembly of FIG. 2 into the outer cell pipe member;

FIG. 7 is a diagrammatic view showing the post vulcanization step to complete the cell assembly;

FIG. 8 is a diagrammatic view showing the start of a step in an alternate procedure for forming an improved shock cell;

FIG. 9 is a diagrammatic view showing the completion of the step shown in FIG. 8;

FIG. 10 is a section through a molded rubber insert that may be used in another alternate procedure for forming an improved shock cell; and FIG. 11 is a diagrammatic view showing a step in the alternate procedure using the molded rubber insert of FIG. 10.

Similar numerals refer to similar parts throughout the various figures of the drawings.

DESCRIPTION OF THE PREFERRED EMBODIMENTS

First Embodiment

Figure 1:
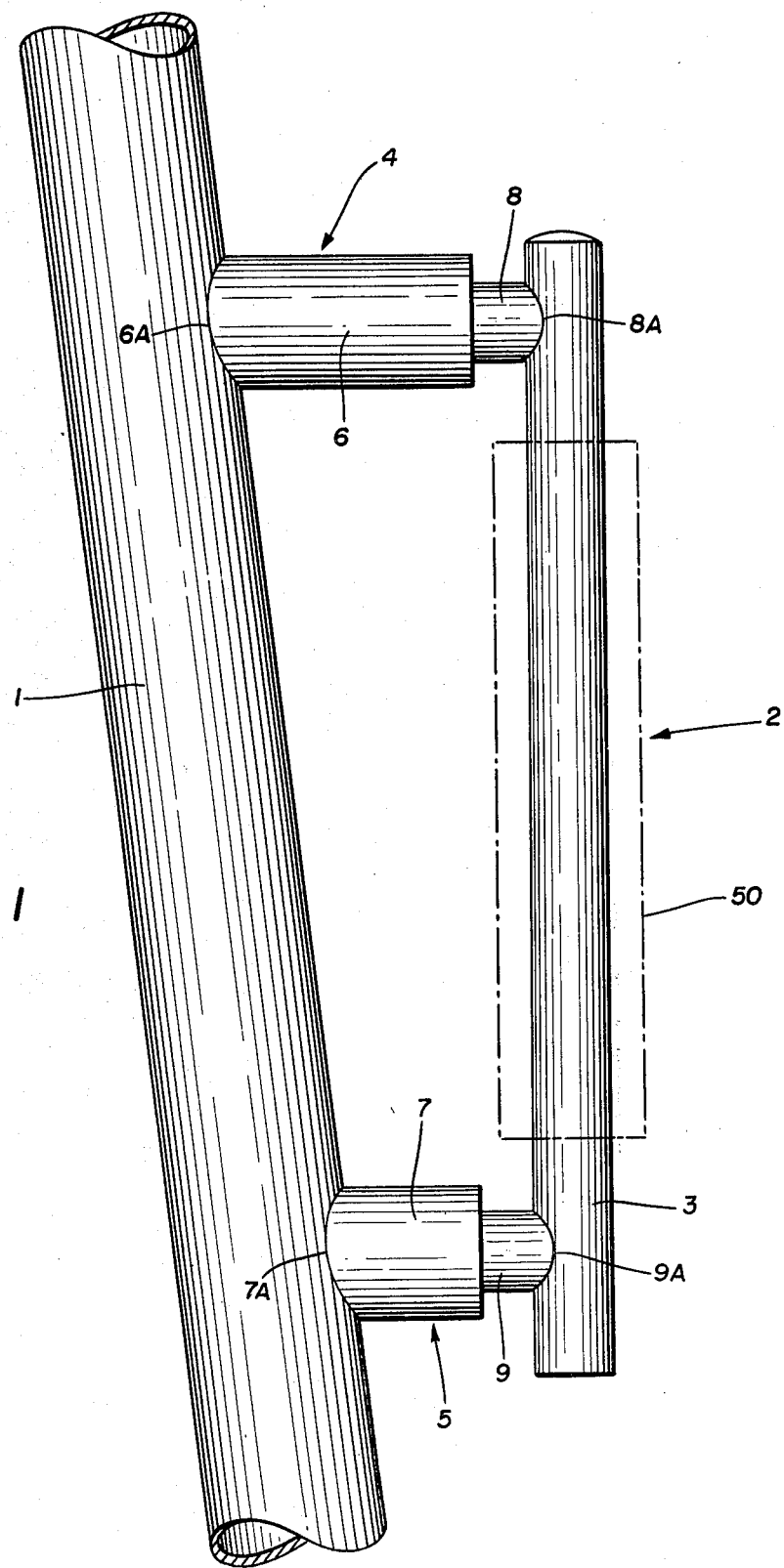
FIG. 1 is a somewhat diagrammatic view of a typical oil rig bumper mounted on a leg of a platform structure with upper and lower shock cells of the improved construction.

The mounting of a bumper on the leg 1 of a typical oil rig structure is generally indicated at 2 in FIG. 1. The bumper may have a vertical member 3 supported by upper shock cell 4 and lower shock cell 5 on the leg 1.

Shock cells 4 and 5 have the improved construction described in detail below in connection with FIG. 3. The outer pipe members 6 and 7 are connected or mounted in any usual or desired manner on the leg 1 at 6a and 7a, respectively. The inner members 8 and 9 of shock cells 4 and 5 are connected at 8a and 9a in any desired manner to the bumper vertical member 3 to support the member 3.

The upper shock cell 4 (FIG. 3) is identical to the lower shock cell 5 except for the length of the outer pipe member 6 thereof which is longer than the outer pipe member of lower cell 5. For this reason only cell 4 is described in detail.

The pipe members 6 and 8 may be ¾" steel pipe. Outer member 6 may be 30" in diameter and 40" long although it can have any greater desired length. Inner member 8 may be 18" in diameter and say 36" in length. The dimensions given are merely by way of example to show the relative sizes of the members and the magnitude of the product. Some shock cells may even be larger. The relative lengths and diameters of shock cell inner and outer pipe members are selected to accommodate the diameter of the platform leg 1 and the diameter and length of the vertical bumper member 3 to be mounted on the leg.

The inner pipe member 8 is connected with the outer pipe member 6 of shock cell 4 (FIG. 3) by a rubber body or sleeve 10 in a state of rubber compression and bonded by an inner bond 11 to the inner end of inner pipe member 8. The inner bond 11 is formed by adhesives and vulcanization in a manner described below in connection with describing the method of manufacture of the shock cell 4.

The rubber body 10 also is bonded by an outer bond 12 to and within the inner surface of the outer end portion of outer pipe member 6 as shown. The outer bond 12 is a post-vulcanization-bond achieved by the addition of adhesives and heat.

The lower shock cell 5, as stated, is identical with the upper shock cell 4 excepting for the shorter length of the lower shock cell outer member 7. Depending upon the design of the leg structure and bumper, the upper shock cell 4 must have an outer pipe member 6 of a length to accommodate the design requirements. In accordance with the invention the outer pipe member 6 is free of circumferential welds. The length of the pipe member 6 is indicated as having the required predetermined value within a range, and free of welds, by the diagrammatic break 13 indicated in FIG. 3.

Second Embodiment

FIG. 4 illustrates a slight modification of the shock cell construction shown in FIG. 3. The shock cell 14 in FIG. 4 has the same construction as that of FIG. 3 with respect to the outer pipe member 15, inner pipe member 16, rubber body 17 and the inner and outer bonds 18 and 19 as compared with the same components in the construction shown in FIG. 3. However, the shock cell 14 is modified by welding a heavy plate 20 within the outer pipe member 15 spaced from the inner end of the inner pipe member 16; and by welding a heavy plate 21 within and adjacent the inner end of the inner pipe member 16. Further, an annular doughnutlike rubber cushion 22 is bonded to the end of the inner pipe member 16 and to the plate 21.

The cushion 22 and the normal spacing therefrom of the plate 20 are such that the cushion 22 will strike the plate 20 and stop further movement of the inner pipe member 16 when the shock cell is absorbing energy from an external thrust at the designed time of possible failure of the shock cell by extreme elongation under tension of the rubber in the rubber body 17 normally under compression.

The heavy plate 20 and its welded connection with the outer pipe member 15 are designed to resist fracture of and failure or shattering of these components during energy absorption by the shock cell.

Method of Shock Cell Manufacture

Having described the structure and new characteristics of the improved shock cell construction, the new method of manufacture of such improved shock cells 4, 5 or 14 is described in connection with FIGS. 2, 3 and 5 to 7. The manufacture of shock cells 4 or 5 involve a new radically different procedure from that traditionally used in making prior shock cell devices mounting bumpers on offshore oil rig structures.

Figure 5:
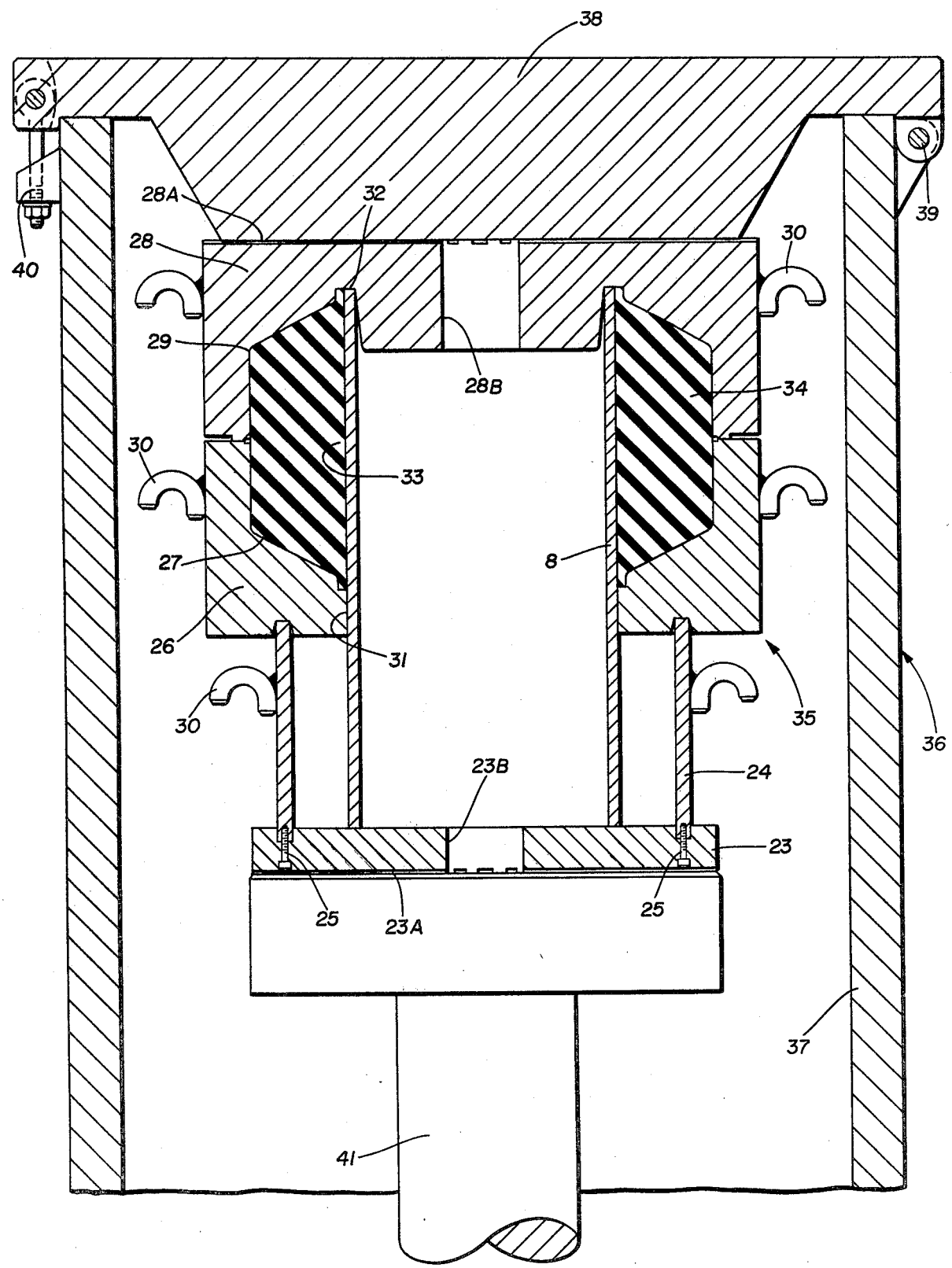
FIG. 5 is a diagrammatic view of a mold and press for molding the assembly shown in FIG. 2.

FIG. 5 illustrates a mold comprising a bottom plate 23 on which a cylindrical spacer ring 24 is removably mounted. The ring 24 is assembled to the bottom plate 23 by studs 25, and is removable so that various rings 24 having different axial lengths may be mounted on the bottom plate 23 to accommodate molding of a rubber body around one end of inner shock cell pipe members of different lengths.

A lower mold member 26 having a lower mold cavity 27 therein is supported on ring 24 and the mold is closed by an upper mold member 28 formed with the upper mold cavity 29. The mold members may be handled by lifting means engaged with lug hooks 30 in a usual manner.

With the upper mold member 27 removed, an inner shock cell pipe member 8 is inserted through the mold cavity opening 31 with which it has a close fit, to rest on the bottom plate 23. Member 8 extends upward and its upper end is engaged in a recess 32 in the upper mold cavity walls, thereby forming a compartment 33 when the mold is closed. Before inserting member 8 into mold opening 31 the upper end of member 8 is wrapped with uncured rubber which enters and fills the compartment 35 before the mold is closed. This rubber is vulcanized and bonded to and around the upper end portion of the inner shock cell pipe member 8, and forms a rubber insert 34 from which the rubber body or sleeve 10 in the shock cell 4 is formed.

Before the inner pipe member is inserted through the mold cavity opening 31, the outer surface area of member which, when located in the mold, forms a part of the mold compartment 33, is coated with an adhesive rubber cement. For this purpose Chemlok 205-220E may be used which is a product of Lord Corporation, Hughson Chemical Company division of Erie, Pa. This product is a two-component system. One component thereof is Chemlok 205 which is a rubber-to-metal adhesive primer that is first applied as a prime coat to the desired outer area of the metal pipe member 8. Then a second coating of the Chemlok 220E is applied over the prime coat, this component being an elastomeric bonding agent.

After the mold assembly generally indicated at 35 in FIG. 5 is closed with the pipe member 8 therein and the compartment 33 filled with uncured rubber, the assembly 35 is placed in a typical usual pot heater generally indicated at 36. The pot heater 36 includes a container 37 closed by a usual lid or cover 38 which may be hinged at 39 and latched closed by typical latch means 40.

The usual pot heater hydraulic ram 41 in the lower portion of the pot heater container 37 supports the mold assembly 35 when placed in the pot heater and after the lid 38 is closed and locked, the ram 41 is raised to clamp the mold assembly 35 closed against the lid 38 in a typical manner.

Steam is introduced into the pot heater compartment 37 in the usual manner to supply heat for vulcanizing the uncured rubber in mold compartment 33. A usual vulcanizing operation is then carried out. The uncured rubber introduced into the mold compartment 33 preferably is characterized by high tensile strength of over 3,000 psi. and high elongation in the area of about 500%. This uncured rubber in the mold is vulcanized and bonded to the pipe member 8 using typical vulcanizing conditions of temperature ranging from 280° F. to 300° F. for a time of 4-8 hours.

The pot heater 36 then is opened, the mold assembly 35 removed from the pot heater, the upper mold member 28 removed when the pipe member 8 with the rubber insert 35 adhesively and vulcanized-bonded thereto (FIGS. 2 and 5) may be removed from the lower mold member 26.

In this manner a subassembly indicated at 43 (FIG. 2) of the shock cell 4 is produced comprising the pipe member 8 with the rubber insert 34 bonded thereto. The rubber insert 34 has an annular or ringlike shape, trapezoidal in cross section as shown preferably with similarly conically tapered ends 42.

In connection with the vulcanizing operation illustrated in FIG. 5, the bottom plate 23 on which the mold assembly 35 is mounted has a series of radially extending grooves 23A in its undersurface and the upper mold member 28 has a similar series of radially extending grooves 28A in its top surface through which steam in the pot heater 36 may pass to flow inside of the inner pipe member 8 through openings 23B and 28B, respectively, in the bottom plate 23 and upper mold member 28. This enables the mold assembly 35 to be heated from within as well as around the outside thereof from the steam in the pot heater in carrying out the vulcanizing operation.

The next step in the manufacture of a shock cell 4 involves inserting the insert 34 of the subassembly 43 into the smaller diameter open end of an outer pipe member 6. This is accomplished by placing the outer pipe member 6 on top of an hydraulic cylinder 44 with a double-acting piston 44A therein, the inner cylindrical surface of the upper open end of the pipe member 6 where the rubber insert material 34 is to be bonded, being coated with an adhesive and a lubricant which may be petroleum base oils. The adhesive may be a usual rubber-to-metal adhesive and Chemlok 205-220E may be used for this purpose in the manner previously described.

A funnel 45 is mounted and supported on the upper end of the pipe member 6 (as shown in FIG. 8) and a subassembly 43 may be placed on the funnel 45 with the insert 34 partially entered into the conical inner surface 46 of the funnel 45.

The double-acting piston 44A has a piston rod 44B extending through the head of cylinder 44 upward through the outer pipe member 6 and through the inner pipe member 8 of the subassembly 43 and through the plate 47 with which it is engaged by a nut 47A. Movement of the piston 44A by hydraulic pressure when applied, downward in cylinder 44 applies an assembly force through the piston rod 44B and plate 47 to the upper end of the pipe member 8, to force the insert 34 into the open smaller diameter upper end of the pipe member 6 from the position shown in full lines in FIG. 6 to the dot-dash line position of the lower end of pipe member 8 indicated at 48. This operation typically is known in the rubber industry as "shooting" the insert into a smaller diameter cylinder and the terms "shooting" or "shot" are used herein to describe such operation.

After the assembly 43 has been shot into the outer shock cell pipe member 6, the relative position and shape of the components are those shown in FIG. 3 wherein the insert 34 of subassembly 43 has been deformed and reshaped to the rubber body or sleeve form 10 shown in FIG. 3, the rubber being in a state of high compression or preload.

The thus shot shock cell 4 assembly is then placed in a pot heater or autoclave indicated diagrammatically at 49 in FIG. 7 and subjected to a post-vulcanizing treatment by heating with steam introduced into the pot heater 49 to bond the rubber body 10 to the pipe member 6 to a temperature in the range of 300° F. for a typical time of one hour.

In this manner the shock cell 4 of FIG. 3 is produced with the rubber body 10 thereof bonded at 11 and 12, respectively, to the pipe members 8 and 6 and with the rubber body 10 under a state of high compression within the body, which subjects the inner and outer bonds 11 and 12 to high pressure.

A fundamental facet of the concepts of the invention is that the outer pipe member 6 may have any desired length free of circumferential welds for installation on an oil rig structure either as an upper shock cell 4 or a lower shock cell 5 to mount a vertical member 3 for a bumper 2 on a platform structure leg 1 (FIG. 1).

In a typical bumper installation, the vertical member 3 of the bumper 2 may be surrounded by a series or stack of rubber members such as rings, tires or the like rotatable on the member 3 and indicated by the dot-dash outline 50 in FIG. 1.

The foregoing description of an improved method for manufacturing the improved shock cells sets forth the best mode that applicants have contemplated for such manufacture.

However, the improved shock cell may be made by varying the order of steps and using different manufacturing apparatus. Such modified procedures are described briefly below under headings of First and Second alternate procedures, etc.

First Alternate Shock Cell Manufacturing Procedure

FIGS. 8 and 9 briefly describe an alternate procedure wherein the rubber body that is bonded to and connects the outer and inner pipe members initially is molded inside of one end of the larger diameter outer pipe member and then the inner pipe member is inserted or shot into the smaller diameter interior of the rubber body to place the latter under high compression, with adhesive bonds being formed between the compressed rubber body and the outer and inner pipe members.

In accordance with this alternate procedure, a subassembly indicated at 51 in FIG. 8 is molded in a manner generally similar to the molding step illustrated in FIG. 5, the subassembly comprising the outer pipe member 52 and the annular rubber insert 53. As previously described with respect to the subassembly 43, the rubber insert 53 is vulcanized and adhesively bonded to the member 52 using the described adhesives and vulcanizing procedure.

A subassembly 51 then is held on a platform 54 and an inner shock cell pipe member 56 held between a rounded or tapered entry nose 57 and a plunger 58 is forced or shot into the smaller diameter inner opening of the rubber insert 53.

Movement of the nose, pipe and plunger assembly downward from the position of FIG. 8 to that of FIG. 9 deforms the rubber insert 53 to enlarge its inner diameter with the body 59 under compression between the pipe members 56 and 52. In connection with shooting the pipe member 56 into the subassembly 51, adhesive, as previously described, is applied to the outer surface of the lower end of pipe member 56 as well as a lubricant.

The assembled shock cell, generally indicated at 60 in FIG. 9, then is subjected to the post-vulcanizing step in a pot heater or autoclave such as diagrammatically represented in FIG. 7 at 49 in the manner previously described. The end shock cell product 60 is substantially indentical to the end product 4 described in connection with FIGS. 5 through 7.

Second Alternate Shock Cell Manufacturing Procedure

The other alternate procedure for producing the improved shock cell is described in connection with FIGS. 10 and 11. FIG. 10 illustrates a rubber insert 61 molded and vulcanized in a typical mold not shown which may have the general shape or contour in cross section indicated.

An outer shock cell pipe member 62 is then held on a platform 63 by funnel 64 and one of the inserts 61 held by a plunger 65, as shown in dot-dash lines in FIG. 11, is shot through the funnel 64 into the upper smaller diameter end of the outer pipe member 62 as indicated in full lines in FIG. 11. Adhesive is applied to the inner surface of the pipe member 62 and a lubricant applied to the insert 61 in connection with the shooting operation.

The shot product or subassembly, generally indicated in full lines at 66 in FIG. 11, is quite similar to the subassembly 51 shown in FIG. 8.

The subassembly 66 then may have an inner shock cell pipe member shot therein in a manner similar to that described in connection with FIGS. 8 and 9 to provide an assembled shock cell, it being understood that adhesives and lubrication are used in inserting such inner pipe member into the subassembly 66. Thus the insert 61 of FIG. 10 will be deformed to provide a rubber sleeve under compression between the inner and outer pipe members of the completely assembled shock cell.

This completely assembled product then may be subjected to a post-vulcanizing operation in a pot heater or autoclave such as diagrammatically indicated at 49 in FIG. 7 to provide the adhesive bonds between the rubber sleeve joining the inner and outer shock cell pipe members thereby producing a completed shock cell having substantially equivalent properties to those set forth in the above description of the other alternate equivalent manufacturing procedures.

IN GENERAL

Each of the foregoing alternative procedures for making the new shock cells enables the rubber-in-tension body and bonds between inner and outer cell pipe members which characterize prior art devices to be eliminated and provide a new structure having the bonding rubber body and the bonds of the body with the metal pipes in high compression.

Further, the new procedures each enable the shock cell devices to be made with any desired selected length of outer pipe member free of circumferential welds.

Accordingly, the new methods and products satisfy the stated objectives and solve problems and satisfy needs that have long existed in the art.

In the foregoing description, certain terms have been used for brevity, clearness and understanding; but no unnecessary limitations are to be implied beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the new shock cell is manufactured, constructed and functions; and the advantageous, new and useful results obtained; the new and useful structures, devices, components, elements, arrangements, parts, combinations, operations, procedures, methods, and relationships are set forth in the appended claims.

We claim:

1. Energy-absorbing shock cell construction for mounting bumper devices on legs of offshore oil rig structures including an inner small diameter metal pipe member, an outer large diameter metal pipe member, an annular sleevelike vulcanized rubber body located between telescoped end portions of said inner and outer pipe members, an adhesive vulcanized bond between said sleevelike rubber body and one of the pipe members, an adhesive post-vulcanized-bond between said body and the other pipe member, and said sleevelike rubber body being maintained under compression between said vulcanized bonds with said inner and outer pipe members to absorb energy by deflection of the rubber under compression when external force is applied to the outer end of the inner pipe member.

2. The construction defined in claim 1 in which the sleevelike rubber body maintained under compression has an inner vulcanized bond to and around an end portion of the inner pipe member and has a post-vulcanized outer bond to and within an end portion of the outer pipe member.

3. The construction defined in claim 1 in which the oil rig structure leg is outwardly downwardly angled with respect to the vertical; in which a bumper device is mounted on such angled leg with upper and lower shock cells having the defined construction; in which the upper and lower shock cell outer metal pipe members are connected at spaced locations with the angled leg; in which the upper shock cell outer metal pipe member is longer than the lower shock cell outer metal pipe member; and in which the upper shock cell outer metal pipe member is free of circumferential welds between its ends.

* * * * *